United States Patent Office 2,805,222
Patented Sept. 3, 1957

2,805,222

PROCESS OF PREPARING 1,3,5-TRIAZINE-2,4,6 TRICARBOXYLIC ACID

Christoph J. Grundmann and Ehrenfried Kober, Columbus, Ohio, assignors to Olin Mathieson Chemical Corporation, a corporation of Virginia No Drawing. Application September 18, 1956, Serial No. 610,635

6 Claims. (Cl. 260—248)

Our invention relates to the preparation of high purity, 1,3,5 - triazine - 2,4,6 - tricarboxylic acid and its chloride salt by means of simple and novel reactions.

It is known that esters of cyanoformic acid can be readily polymerized to the corresponding esters of 1,3,5-triazine - 2,4,6 - tricarboxylic acid:

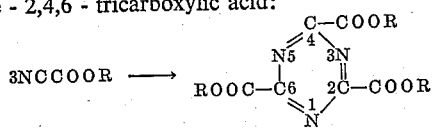

wherein R is methyl or ethyl, for example. Treatment of these esters with aqueous potassium hydroxide leads to the corresponding tri-potassium salt,

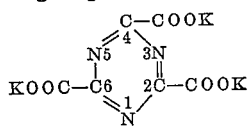

The use of the hydroxides of the other alkali metals, e. g. sodium or lithium, produces the corresponding salts. It is reported that the free acid cannot be obtained from the potassium salt. Gentle warming of aqueous solutions of the potassium salt produces ammonia indicating the strong tendency of this compound to undergo hydrolytic cleavage resulting in complete destruction of the molecule. Alternatively, a cold aqueous solution of the potassium salt can be acidified with dilute mineral acids. However, an impure product results due to the strong tendency of the free triazine tricarboxylic acid to adsorb the inorganic salts formed. The inorganic salt, for example potassium chloride if dilute hydrochloric acid is used on the potassium salt of the triazine tricarboxylic acid, cannot be removed by leaching the product with water or other selective solvents. Furthermore, such crude acid as is formed by this method also contains organic impurities, such as oxamic and cyanuric acids, resulting from side hydrolytic reactions.

A known route for the preparation of 1,3,5-triazine-2,4,6-tricarboxylic acid chloride involves reaction of its ethyl ester with phosphorus pentachloride to form the tricarbonic acid chloride. This method produces a very impure oil whose complete purification is very difficult and uneconomical.

We have found that 1,3,5 - triazine - 2,4,6 - tricarboxylic acid chloride (II) can be readily prepared by reacting an alkali metal salt of 1,3,5-triazine-2,4,6-tricarboxylic acid (I) with phosphoryl chloride. The recovery of the pure acid chloride is easily accomplished by extraction and subsequent removal of the extractant by distillation. We have also found that our high purity acid chloride can be reacted with formic acid to form a high purity 1,3,5-triazine-2,4,6-tricarboxylic acid (III). This reaction cannot be accomplished by hydrolysis, as normally expected. Hydrolysis does not yield the free acid, but 2,4,6-trihydroxy-1,3,5-triazine is formed. The ease of separation of the free triazine tricarboxylic acid from the reaction mixture is another advantage peculiar to our reaction. The by-products are all gaseous and the product is insoluble in formic acid. Initial separation is attained by decantation or by means of filtration.

The process of our invention is illustrated by the following equations:

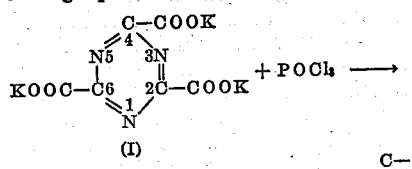

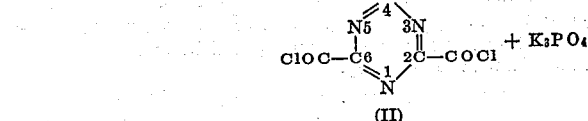

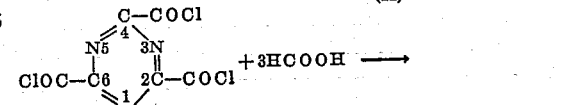

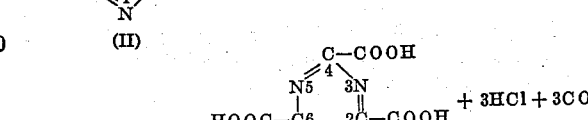

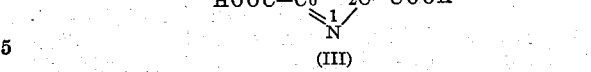

According to our invention, the 1,3,5-triazine-2,4,6-tricarboxylic acid chloride is made by slowly adding the alkali metal salt, e. g. the potassium salt, of 1,3,5-triazine-2,4,6 - tricarboxylic acid to phosphoryl chloride. Preferably, the addition takes place at a temperature of about 10° to 30° C. The reaction temperature can go as high as about 100° C., however. After the initial reaction appears to have stopped, the mixture is refluxed, e. g. at about 104° C., for about 2 to 6 hours. The product can be separated most easily by extraction as for example with an organic solvent such as diethyl ether. The free acid is then prepared by admixing the chloride with anhydrous formic acid and preferably at about 0° to 30° C. The formic acid is preferably in excess by 4 to 10 times the stoichiometric amount. This mixture should not be heated because of undesirable side reactions which tend to lower the yield and the purity of the triazine tricarboxylic acid. The reaction is, therefore, allowed to go to completion at room temperature for about 12 to 60 hours.

The following examples further illustrate our process.

*Example I*

The potassium salt of 1,3,5 - triazine - 2,4,6 - tricarbonic acid was slowly added to 160 grams of phosphoryl chloride with stirring. At the end of 10 minutes a total of 37 grams of the salt had been added and the temperature within the reaction flask rose to 70° C. When the spontaneous reaction stopped, the mixture was refluxed at 104° C. for 2 hours. After cooling the mixture, it was extracted with three 100 milliliter portions of anhydrous ether. The three extracts were combined and distilled. The 1,3,5 - triazine - 2,4,6 - tricarboxylic acid chloride came over, after the ether and excess phosphoryl chloride, at 114°–115° C. and 0.2 millimeter, as a slightly yellow liquid. Upon standing the product crystallized to give 21.8 grams, or 73 percent of the theory, of crystals which melted at 54.5°–56° C. and whose refractive index was $n_D^{20}$ 1.647.

|  | C | Cl | N |
|---|---|---|---|
| Calculated for $C_6Cl_3N_3O_3$ | 26.85 | 39.63 | 15.66 |
| Found | { 26.82 <br> 27.00 | 40.07 <br> 39.60 | 15.89 <br> 15.89 |

Example II

While stirring 50 grams of anhydrous formic acid at 0° C., 14.4 grams of the 1,3,5-triazine-2,4,6-tricarboxylic acid chloride was added, dropwise, thereto. The stirring was continued for 14 hours at room temperature during which time hydrogen chloride and carbon monoxide were evolved and a white precipitate of 1,3,5 - triazine - 2,4,6 - tricarboxylic acid formed. After allowing the mixture to stand for two more days at room temperature, the free acid was separated by suction-filtration, washed with ether and dried in vacuo over potassium hydroxide. Final purification was accomplished by Soxhlet extraction with ether for 48 hours. The yield was 9.4 grams, 82 percent of the theory, of odorless, white crystals which decomposed between 160° and 350° C. without melting.

|  | C | H | N |
|---|---|---|---|
| Calculated for $C_6H_3N_3O_6$ | 33.81 | 1.42 | 19.72 |
| Found | 31.95 | 2.37 | 18.99 |
|  | 31.92 | 2.15 | 18.84 |

The hydrogen values are high because the product cannot be completely dehydrated by drying below its decomposition temperature.

We claim:

1. A method of preparing 1,3,5 - triazine - 2,4,6 - tricarboxylic acid which comprises admixing an alkali metal salt of 1,3,5 - triazine - 2,4,6 - tricarboxylic acid with phosphoryl chloride to form 1,3,5 - triazine - 2,4,6-tricarboxylic acid chloride and admixing said acid chloride with formic acid.

2. A method of preparing 1,3,5 - triazine - 2,4,6-tricarboxylic acid which comprises admixing an alkali metal salt of 1,3,5 - triazine - 2,4,6 - tricarboxylic acid with phosphoryl chloride at a temperature of about 10° to 100° C. to form 1,3,5 - triazine - 2,4,6 - tricarboxylic acid chloride and admixing said acid chloride with formic acid at a temperature of about 0° to 30° C.

3. A method of preparing 1,3,5 - triazine - 2,4,6-tricarboxylic acid chloride which comprises admixing an alkali metal salt of 1,3,5 - triazine - 2,4,6 -tricarboxylic acid with phosphoryl chloride.

4. A method of preparing 1,3,5 - triazine - 2,4,6-tricarboxylic acid chloride which comprises admixing an alkali metal salt of 1,3,5 - triazine - 2,4,6 - tricarboxylic acid with phosphoryl chloride at a temperature of about 10° to 100° C.

5. A method of preparing 1,3,5 - triazine - 2,4,6-tricarboxylic acid which comprises admixing 1,3,5 - triazine - 2,4,6 - tricarboxylic acid chloride with formic acid.

6. A method of preparing 1,3,5 - triazine - 2,4,6-tricarboxylic acid which comprises admixing 1,3,5 - triazine - 2,4,6 - tricarboxylic acid chloride with formic acid at a temperature of about 0° to 30° C.

No references cited.